United States Patent [19]

Harrison et al.

[11] Patent Number: 5,274,948
[45] Date of Patent: Jan. 4, 1994

[54] FISH HOOK DISENGAGING TOOL

[76] Inventors: Hubert T. Harrison, Rte. 1, Box 799, Hortense, Ga. 31543; Gene Yeomans, Sr., 207 Spruce Rd., Brunswick, Ga. 31525

[21] Appl. No.: 984,859

[22] Filed: Dec. 3, 1992

[51] Int. Cl.$^5$ .............................................. A01K 97/00
[52] U.S. Cl. ................................................... 43/53.5
[58] Field of Search ....................................... 43/53.5

[56] References Cited

U.S. PATENT DOCUMENTS

| 2,215,275 | 9/1940 | Phillips | 43/53.5 |
| 2,724,207 | 11/1955 | Miller | 43/53.5 |
| 2,887,817 | 5/1959 | Sharpe | 43/53.5 |
| 3,099,100 | 7/1963 | Wiseman | 43/53.5 |
| 3,374,570 | 3/1968 | Lenzen | 43/53.5 |
| 3,397,479 | 8/1968 | Tyjewski | 43/53.5 |
| 4,127,957 | 12/1978 | Bourquin | 43/53.5 |
| 4,914,853 | 4/1990 | Swindle | 43/53.5 |

Primary Examiner—Kurt C. Rowan
Attorney, Agent, or Firm—Thomas C. Saitta

[57] ABSTRACT

A fish hook disengaging device is disclosed comprising a handle, a first shank portion extending from the handle, a loop member to contact the hook, a second shank portion extending from the loop member back in the direction of the handle, and a gripping member on the end of the second shank portion and adjacent the handle, whereby the user can grasp the handle and the gripping member with one hand during the hook disengaging operation.

8 Claims, 1 Drawing Sheet

FISH HOOK DISENGAGING TOOL

BACKGROUND OF THE INVENTION

The invention relates generally to devices used to remove or extract fish hooks from fish. More particularly, the device relates to such devices which comprise a loop on the end of a handled shank, the loop adapted to be placed around the fishing line and slid down to contact the hook and fish, thereby allowing the fish hook to be disengaging by rotating the fish.

Various devices have been developed to aid the fisherman in removal of a fish hook from a caught fish. The devices enable the fisherman to remove the hook without having to grasp the fish itself. This is preferable when the fish is to be released back into the water, as even minimal contact can be harmful to the fish, and is particularly useful in situations where a potentially dangerous fish such as a catfish or toadfish is caught and must be taken off the line without contacting the spines or teeth.

The basic concept of using a looped metal rod to disengage fish hooks is well known, as illustrated by Ford in U.S. Pat. No. 2,289,767. Ford discloses a device formed from a metal rod, with one end being bent upon itself to form a handle and the other end having a short portion turned back to form a hook or loop. To remove a fish without touching it, the looped end is slipped down the line to contact the fish. The fisherman holds the handle in one hand and grasps the fishing line in the other, separating them to produce a relatively horizontal alignment of the device and the line. The fish is then rotated about the horizontal axis, the motion causing the fish to be disengaged from the hook, whereupon it flies free with minimal damage and no direct contact.

Several improvements to this device have been developed, as shown in U.S. Pat. No. 3,603,021 to Nunley and U.S. Pat. No. 4,127,957 to Bourquin, deceased et al. Nunley positions beads on the shaft down in the loop portion, the beads being used to guide the line and hook. Bourquin teaches a particularly angled bend to form the loop and adds a barb on the free end of the loop to prevent the line from slipping out before it is pulled taught.

While the above devices are all effective, they all suffer from the same problem. Because the hook is extracted by rotating the fish about a horizontal axis formed by pulling the line and device in opposite directions, tension forces are high along the horizontal axis and along the perpendicular rotational axis. This means that the forces combine to pull against the loop, such that over time and particularly when heavy fish are encountered the loop portion of the device will be pulled open. The user must then rebend the loop to its proper shape, which results in a weaker loop, and eventually the loop will break or become too weak to maintain the proper shape.

To prevent this problem, the invention improves on the design and construction of the standard devices by extending the end of the loop back down the shank to the handle and adding a hook, trigger or circle which can be gripped by one or more fingers of the user. In this manner, the loop cannot be bent out of shape during the rotation of the fish to remove the hook. This construction gives the user more control against the torque effects as well, especially when used with large fish, to prevent the device from twisting in the user's hand.

SUMMARY OF THE INVENTION

The invention is a fishhook disengaging tool comprising a handle member and a rod member, the rod member comprising a first shank portion extending from the handle, a hook contacting looped portion having an approximately 180 degree bend, a second shank portion extending from the loop portion back toward the handle, and a gripping member on the end of the second shank portion. The gripping member is adjacent the handle whereby the user can hold both the handle and the gripping member with the same hand. Preferably, the gripping member is a hook or bend shaped to allow the user to grasp it with the index finger of the hand holding the handle. Thus there is no free, uncontrolled end when the device is being used, such that the looped portion cannot be bent out of shape during rotation of the fish to disengage the hook.

DETAILED DESCRIPTION OF THE INVENTION

Figure 2:
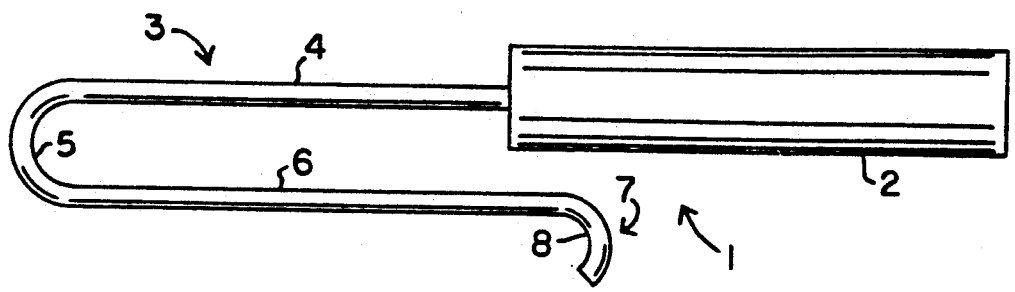
FIG. 2 is a side view of the invention.

With reference now to the figures, the preferred embodiment and best mode of the invention will now be described The invention is a fish hook disengaging tool 1 comprising a handle member 2 and a rod member 3. Rod member 3 further comprises a first shank portion 4, a looped portion 5, a second shank portion 6 and a gripping member 7. Handle 2 is preferably generally cylindrical in shape but may be shaped in any configuration which allows it to be gripped within the palm of the user such that the rod member 3 extends outward between the thumb and forefinger Handle 2 may be constructed of may be constructed of wood, plastic, metal or any other suitable material. Rod member 3 extends from the longitudinal central axis of handle 2 and is preferably constructed of stainless steel metal or of any other similar type material with similar strength characteristics. As illustrated rod member 3 is circular is cross-section, but rod member 3 can be polygonal or elliptical in cross-section as well.

Figure 1:
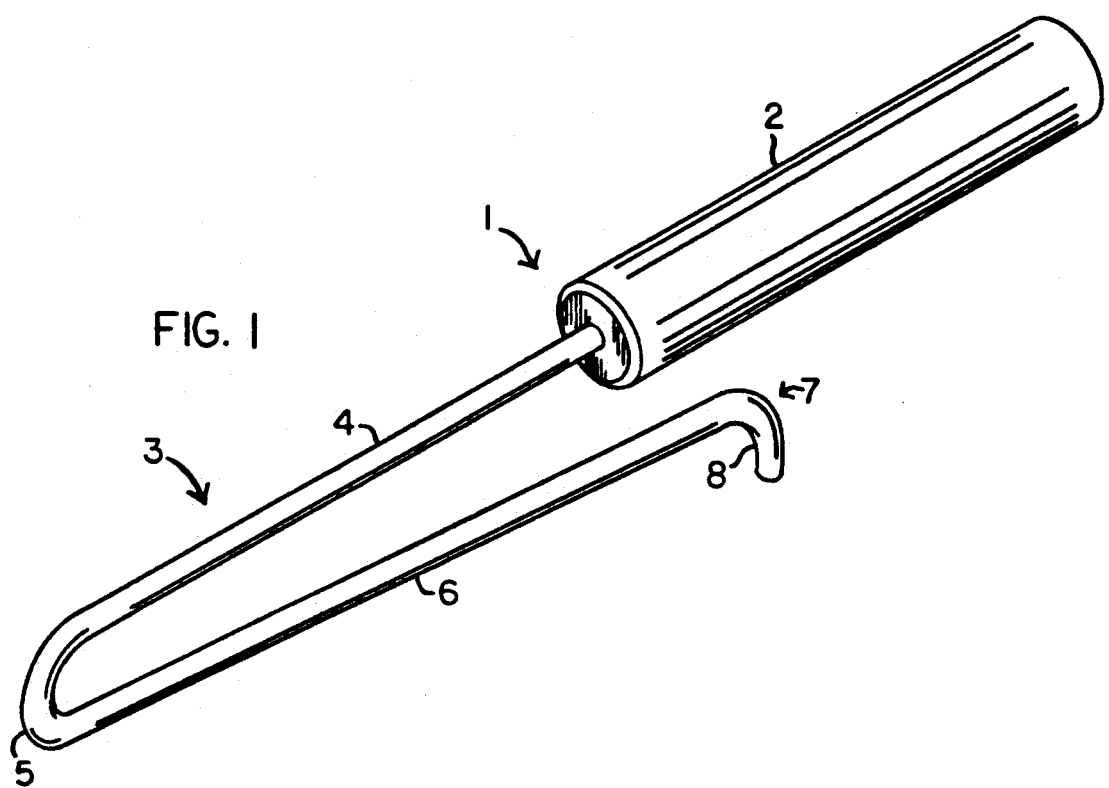
FIG. 1 is a perspective view of the preferred embodiment of the invention.
Figure 3:
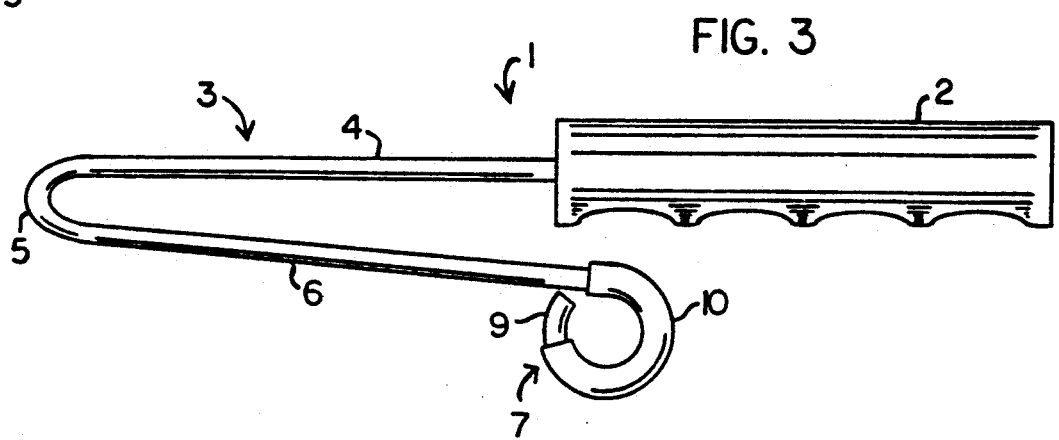
FIG. 3 is a side view of an alternative embodiment of the invention.

Referring now to FIGS. 1 and 2, the preferred embodiment of the fish hook disengaging tool 1 is illustrated. Rod member 3 comprises a straight first shank portion 4 which extends from handle 2 to the hook contacting loop portion 5. Loop portion 5 is preferably a full 180 degree semi-circular bend in rod member 3 such that second shank portion 6 extends back parallel to first shank portion 4 and ends beside handle 2. Bends of slightly less than or more than 180 degrees are also possible, in which case the first shank portion 4 and the second shank portion 6 will not be parallel, as shown in FIG. 3. Rod member 3 ends in gripping member 7 which is connected to second shank portion 6 and is positioned adjacent to the forward part of the handle 2.

Gripping member 7 is a means for the user to grasp and control the second shank portion 6 using one or more fingers of the hand holding the handle 2. For ease of construction and use, gripping member 7 is preferably an arcuate bend forming a hook o trigger 8 which can be pressed against the forward part of the handle 2 by the index finger of the user. In this manner both the first shank portion 4 and the second shank portion 6 are firmly controlled by the user during the pulling and rotating operations to disengage the hook from the fish, since the handle 2 and gripping member 7 are pressed together and controlled by one hand. Alternatively, the second shank portion 6 may be extended so that more than one finger may be used to control the gripping member 7. In still another embodiment, as shown in FIG. 3 the gripping member 7 may be a complete finger loop 9 sized to allow insertion of one or more fingers. As a further improvement, a non-slip member 10, such as an elastic plastic tube, a coating material or other like material exhibiting non-slip properties, may be incorporated or positioned onto the gripping member 7 to improve grip.

When a fish is caught and it is desired to remove the fish hook without contacting the fish, the fisherman grasps the fish hook disengaging tool 1 by the handle 2 and hooks rod member 3 around the fishing line or leader, slipping the line into the open area between the handle 2 and the gripping member 7. The user then grips the gripping member 7 with his finger and presses the gripping member 7 toward the handle 2, thus securing the second shank portion 6. The looped portion 5 is slid down into contact with the fish hook. The user grasps the fishing line with his free hand and pulls to create a horizontal alignment of the disengaging tool 1 and the fishing line. The fish is then rotated about this horizontal axis. The looped portion 5 acts in conjunction with the curved fish hook, such that the rotation frees the fish from the hook. Because the looped portion 5 extends into a second shank portion 6 which is controlled by the gripping member 7, the rotating and pulling forces cannot bend the looped portion 5 out of shape. Additionally, the presence of the second shank portion 6 held in place by the user's hand holding the handle 2 and gripping member 7 better resists the torquing or twisting effects of the rotation of the fish, two shanks being stronger than a single shank.

It is anticipated that those skilled in the art may envision certain obvious equivalents or substitutions for elements of the invention described above, and the above illustrations are by way of example only. The true scope and definition of the invention therefore is to be as set forth in the following claims.

We claim:

1. A fish hook disengaging device for removing a fish hook from a fish without the user having to grasp the fish itself, comprising a handle, a first shank portion extending from and parallel to the longitudinal axis of said handle, a second shank portion of greater length than said first shank portion, a hook contacting loop portion connecting said first shank portion, a hook contacting loop potion connecting said first shank portion to said second shank portion, and a gripping member connected to the end of said second shank portion, whereby said second shank portion extends back to said handle such that said gripping member is positioned adjacent said handle portion whereby both said handle and said gripping member can be controlled with one hand.

2. The device of claim 1, where said gripping member is in the shape of an arcuate bend.

3. The device of claim 1, where said gripping member is in the shape of a loop.

4. The device of claim 1, where said loop portion has a bend of approximately 180 degrees.

5. The device of claim 1, where said first shank portion and said second shank portion are parallel.

6. The device of claim 1, further comprising a non-slip member positioned on said gripping member.

7. The device of claim 1, where said first shank portion, said second shank portion, said loop portion and said gripping member are composed of stainless steel.

8. The device of claim 1, where said gripping member is adapted to be engaged by several fingers.

* * * * *